United States Patent [19]

Phillips, Jr.

[11] 4,250,065

[45] Feb. 10, 1981

[54] FLAME RETARDANT NYLON HAVING IMPROVED MOLDABILITY

[75] Inventor: Richard E. Phillips, Jr., Pensacola, Fla.

[73] Assignee: Monsanto Company, St. Louis, Mo.

[21] Appl. No.: 46,391

[22] Filed: Jun. 6, 1979

[51] Int. Cl.³ .................................................. C08J 3/20
[52] U.S. Cl. ............................. 260/18 N; 260/33.4 R; 260/45.75 W; 260/DIG. 24
[58] Field of Search .... 260/18 N, DIG. 24, 45.75 W, 260/33.4 R

[56] References Cited

U.S. PATENT DOCUMENTS

| 3,009,900 | 11/1961 | Hansen | 260/18 N |
|---|---|---|---|
| 3,224,987 | 12/1965 | Kessler | 260/18 N |
| 3,400,087 | 9/1968 | Robb et al. | 260/18 N |
| 3,755,221 | 8/1973 | Hitch | 260/18 N |
| 3,988,271 | 10/1976 | Phillips | 260/18 N |

FOREIGN PATENT DOCUMENTS

| 851031 | 10/1960 | United Kingdom | 260/18 N |
|---|---|---|---|
| 889403 | 2/1962 | United Kingdom | 260/18 N |

*Primary Examiner*—Ronald W. Griffin
*Attorney, Agent, or Firm*—S. N. Tarter; E. P. Grattan; P. D. Matukaitis

[57] ABSTRACT

A polyamide molding composition having good flame retardant and mold release characteristics and improved moldability comprises a nylon polyamide; 500–5000 ppm each of $C_{12}$-$C_{20}$ aliphatic alcohol and an aluminum salt of a $C_{12}$-$C_{20}$ fatty acid such that the ratio of the parts of salt to the parts of alcohol is at least about 1; and 100–600 ppm of a zinc salt of a $C_{12}$-$C_{20}$ fatty acid.

10 Claims, No Drawings

FLAME RETARDANT NYLON HAVING IMPROVED MOLDABILITY

BACKGROUND OF THE INVENTION

A. Field of the Invention

The invention relates to polyamide compositions having good flame retardant properties and improved moldability.

B. The Prior Art

The use of polyamide resins in molding compositions has become very widespread in recent years especially in end uses where toughness and high temperature stability are required properties. Speciality polyamide resins containing a variety of filler materials have been widely used in a range of automotive applications for example and other polyamides have been successfully introduced into the electrical, appliance and consumer goods fields.

Molding compositions usually require mold release agents. The first of such agents to be employed extensively was stearyl alcohol (disclosed in British Pat. No. 851,031). After it was determined that stearyl alcohol had a deleterious effect on flammability of the nylon the introduction of a fatty acid salt of aluminum, along with the alcohol, as taught in U.S. Pat. No. 3,988,271, was found to provide the same mold release characteristics along with good flame retardant characteristics.

Although the flame retardant-mold release resin system described in U.S. Pat. No. 3,988,271 was indeed an improvement over the prior art and satisfactory for many purposes, there were some disadvantages in its use. One such disadvantage was the formation of a gummy substance in molds, apparently the reaction product of the alcohol and the aluminum salt. Another disadvantage in the use of the resin system described in U.S. Pat. No. 3,988,271 was that aside from considerations attributable to the gummy residue, the melt flow of this resin system was insufficient for the most rapid operation of injection-type molding machines in the automatic mode.

It has now been discovered that with the use of the improved composition of this invention, the build-up of the gummy residue in the molding machines is substantially eliminated, with its resultant improvement in melt flow, all without sacrifice of good flame retardant characteristics.

SUMMARY OF THE INVENTION

The invention is a molding resin having good flame retardant and mold release characteristics and improved moldability comprising a nylon polyamide; 500–5000 ppm each of $C_{12}$-$C_{20}$ aliphatic alcohol and an aluminum salt of a $C_{12}$-$C_{20}$ fatty acid such that the ratio of the parts of salt to the parts of alcohol is at least about 1; and 100–600 ppm of a zinc salt of a $C_{12}$-$C_{20}$ fatty acid.

The total additive (salt plus alcohol) is preferably maintained at from 1000 to 5000 ppm and more usually at from 1500 to 3000 ppm, though amounts outside these ranges may occasionally be required.

The alcohol is one having from 12 to 20 carbon atoms such as lauryl alcohol, cetyl alcohol, stearyl alcohol, myristy alcohol, and eicosyl alcohol. Of these the preferred alcohol is stearyl alcohol on account of its ready availability.

The aluminum and zinc salts can be any of the fatty acid salts of a fatty acid having from 12 to 20 carbon atoms, that is it can be the mono-, di- or tri-acid derivative. In practice, however, the salt preferred is the di-acid salt. The fatty acid from which the salt is derived can be for example lauric acid, myristic acid, palmitic acid, stearic acid or eicosoic acid. Of these alternatives the diacid salts are preferred and particularly aluminum and zinc dipalmitate, aluminum distearate and aluminum dieicosoate. As the amount of the zinc salt increases from 100 ppm to 600 ppm, so does the lube melt fluidity. Use of the zinc salt in amounts in excess of 600 ppm does not increase lube melt fluidity appreciably, and the zinc salt will tend to dust during product manufacture.

The polyamide can be any of those known as nylons such as for example nylon 6, nylon 6/6, nylon 6/9, nylon 6/10, nylon 6/12 as well as copolymers such as nylon 6,6/6 and nylon 6,6/12. The preferred nylon is, however, nylon 6, nylon 6/6 or a copolymer of nylon 6 and nylon 6/6.

DETAILED DESCRIPTION OF THE PREFERRED EMBODIMENTS

As used herein "moldability" means the amenability of the resin to be forced into a mold. The gummy deposit described above interfers with moldability just as does high relative viscosity. Ordinarily high spiral flow (see Table 1) is an indication of low viscosity and good moldability; however, the cumulative effects of a gummy deposit may not be reflected in spiral flow test data.

The following examples demonstrate the effect of varying amounts of zinc salt in an alcohol-aluminum salt system:

EXAMPLE 1

(Comparative Example)

4.54 gm stearyl alcohol and 5.67 gm aluminum distearate were mixed and heated in an aluminum pan at 250°–260° C. The result was a gummy non-fluid mix which was balled up in a mass.

EXAMPLE 2

(Comparative Example)

A mixture of 4.54 gm stearyl alcohol and 5.67 gm aluminum tristearate was heated in the same manner as in Example 1, and formed an extremely viscous melt, but did not form into a gummy mass.

EXAMPLE 3

4.54 gm stearyl alcohol, 0.23 gm zinc stearate and 5.67 gm aluminum tristearate were mixed and heated as in Example 1. The melt was significantly less viscous than Example 2 and the melt fluidity had significantly increased over that of Example 2. The melt had a very slight gum.

EXAMPLE 4

4.54 gm stearyl alcohol, 0.45 gm zinc stearate and 5.67 aluminum tristearate were mixed and melted as in Example 1. The mix melted easily forming a free flowing melt. Melt fluidity was improved over Example 2, and better than Example 3 in the sense that it was easier to make an initial mix with a polyamide.

EXAMPLE 5

4.54 gm stearyl alcohol, 0.68 gm zinc stearate and 5.67 gm aluminum tristearate were mixed and heated as in Example 1. A very free flowing melt was formed, slightly improved over that of Example 4. The melt was easily mixed.

EXAMPLE 6

4.54 gm stearyl alcohol, 0.81 gm zinc stearate and 5.67 gm aluminum tristearate were mixed and heated as in Example 1. The lube melt fluidity of the mix was equal to or slightly better than that of Example 5.

EXAMPLE 7

4.54 gm stearyl alcohol, 1.14 gm zinc stearate and 5.67 gm aluminum stearate were mixed and heated as in Example 1. Melt fluidity was equivalent to that of Example 6. The mix balled up slightly during melting.

EXAMPLE 8

4.54 gm stearyl alcohol, 1.36 gm zinc stearate and 5.62 gm aluminum tristearate were mixed and heated as in Example 1. The melt fluidity was excellent (equal to or better than Examples 6 and 7, but the mix balled up to a slightly greater degree than in Example 7).

EXAMPLE 9

A mixture of stearyl alcohol, zince stearate and aluminum tristearate employing 50% of the amounts of ingredients reported in Example 7 was tested in accordance with Example 7. The result was substantially the same as that of Example 7.

EXAMPLE 10

A mixture of stearyl alcohol, zinc stearate and aluminum tristearate employing 25% of the amounts of ingredients shown in Example 7 was mixed and heated as in Example 1, with the result substantially the same as that of Example 7.

EXAMPLE 11

2.27 gm stearyl alcohol, 0.45 gm zinc stearate and 2.84 gm aluminum tristearate were mixed and heated as in Example 1. The characteristics of the melt were substantially the same as that of Example 9.

EXAMPLE 12

2.27 gm stearyl alcohol, 0.35 gm zinc stearate, and 1.42 gm aluminum tristearate were mixed and heated as in Example 1, with a result substantially the same as Examples 4 and 5.

EXAMPLE 13

4.54 gm stearyl alcohol, 1.81 gm zinc stearate and 5.67 gm aluminum tristearate were mixed and heated as in Example 1. Although the resulting melt was an extremely fluid flow equal to or better than that of Examples 7 and 8, there was a premelt balling of the mix which would seriously handicap any commercial process.

EXAMPLES 14, 15

To a fully dried nylon 66 molding resin, through the dryer, was added the lube melt formulation shown at Table 1. The resulting molding resin had the characteristics shown at Table 1. There was no significant difficulty encountered in mixing the lube system.

TABLE 1

| | EX. 14 Formulation, Nylon 66 Lubed w/TriLube System[1] | EX. 15 Nylon 66 Lubed w/DiLube System[2] | ASTM Procedure Number |
|---|---|---|---|
| Elongation, % | 91 | 105 | D638 |
| Tensile Strength, psi | 11,320 | 11,361 | D638 |
| Izod Impact, ft.lb/in. | 1.18 | 1.19 | D256 |
| Cantilever Stiffness, MPSI | 217.3 | 224.8 | D747 |
| $H_2O$ Absorption, % | 1.11 | 1.13 | D570 |
| Shrinkage, mils/in. | 18.5 | 18.4 | D955 |
| HDTUL (66 psi), °C. | 238 | 236 | D648 |
| HDTUL (264 psi), °C. | 87 | 84 | D648 |
| Molded RV | 54 | 53.4 | D789 |
| UL94,* 1/32" | V2 | V2 | — |
| UL94,* 1/16" | V2 | V2 | — |
| Spiral Flow, in. | 23.1 | 22.4 | — |
| Machine Cycle Time, Sec. | 5 | 5 | — |

*Underwriter Laboratories #94 test procedure for flammability
Samples conditioned 48 hours at 50% RH prior to testing.
[1]Tri-Lube system components
2000 ppm stearyl alcohol
500 ppm zinc stearate
3000 ppm aluminum tristearate
[2]Di-Lube system components
2000 ppm stearyl alcohol
2500 ppm aluminum distearate The polyamide compositions of the invention can if desired incorporate other additives such as fillers, whether if fibrous or granular form, antioxidants, stabilizers, coloring materials, anti-static additives, and the like without materially affecting the applicability of the invention disclosed herein.

It is foreseen that minor variations could be made in the polyamide compositions specifically described herein without materially affecting their effectiveness for the purpose specified. It is intended that all such variations shall be included within the purview of this invention.

I claim:

1. A composition of matter having good flame retardant and mold release characteristics and improved moldability comprising a nylon polyamide; 500–5000 ppm each of $C_{12}$-$C_{20}$ aliphatic alcohol and an aluminum salt of a $C_{12}$-$C_{20}$ fatty acid such that the ratio of the parts of salt to the parts of alcohol is at least about 1; and 100–600 ppm of a zinc salt of a $C_{12}$-$C_{20}$ fatty acid, provided the amount of zinc salt is from about 5 to about 30 percent by weight of the aliphatic alcohol.

2. The composition of claim 1 wherein the nylon is nylon 6/6.

3. The composition of claim 1 wherein the aliphatic alcohol is stearyl alcohol.

4. The composition of claim 1 wherein the aluminum salt is aluminum tristearate.

5. The composition of claim 1 wherein nylon polyamide is nylon 6/6, the aliphatic alcohol is stearyl alcohol, the aluminum salt is aluminum tristearate, and the zinc salt is zinc distearate.

6. The composition of claim 5 wherein the amount of stearyl alcohol is 1800–2100 ppm, the amount of aluminum tristearate is 2500–3300 ppm, and the amount of zinc distearate is 100–600 ppm.

7. The composition of claim 6 wherein the amount of stearyl alcohol is 2000 ppm, the amount of aluminum tristearate is 3000 ppm, and the amount of zinc distearate is 500 ppm.

8. In a composition of matter comprising a nylon polyamide and 500–5000 ppm each of a $C_{12}$-$C_{20}$ aliphatic alcohol and an aluminum salt of a $C_{12}$-$C_{20}$ fatty acid such that the ratio of the parts of salt to the parts of alcohol is at least about 1.0, the improvement comprising also including in the composition 100–600 ppm of a zinc salt of a $C_{12}$-$C_{20}$ fatty acid, provided the amount of zinc salt is from about 5 to about 30 percent by weight of the aliphatic alcohol.

9. The improvement of claim 8 wherein the zinc salt is zinc distearate.

10. The improvement of claim 9 wherein the amount of zinc distearate is 500 ppm.

* * * * *